(12) United States Patent
Deen et al.

(10) Patent No.: US 12,326,935 B2
(45) Date of Patent: Jun. 10, 2025

(54) SYSTEMS AND METHODS FACILITATING INTERACTIONS BETWEEN IMPOSTER DEVICES AND PROTECTED CONTENT SYSTEMS

(71) Applicant: NBCUniversal Media, LLC, New York, NY (US)

(72) Inventors: Robert Glenn Deen, Simi Valley, CA (US); Andrea Elaine Avila Weiler, Los Angeles, CA (US)

(73) Assignee: NBCUniversal Media, LLC, New York, NY (US)

( * ) Notice: Subject to any disclaimer, the term of this patent is extended or adjusted under 35 U.S.C. 154(b) by 283 days.

(21) Appl. No.: 17/893,914

(22) Filed: Aug. 23, 2022

(65) Prior Publication Data
US 2023/0359736 A1    Nov. 9, 2023

Related U.S. Application Data

(60) Provisional application No. 63/337,849, filed on May 3, 2022.

(51) Int. Cl.
G06F 21/56        (2013.01)

(52) U.S. Cl.
CPC .................. G06F 21/566 (2013.01)

(58) Field of Classification Search
CPC .................................................. G06F 21/566
See application file for complete search history.

(56) References Cited

U.S. PATENT DOCUMENTS

| | | | | |
|---|---|---|---|---|
| 2005/0262487 A1* | 11/2005 | Pistoia | .................... | G06F 9/468 717/127 |
| 2006/0026671 A1* | 2/2006 | Potter | ................... | H04L 63/205 726/7 |
| 2013/0263290 A1* | 10/2013 | Xu | ..................... | G07C 9/00571 726/34 |
| 2019/0098006 A1* | 3/2019 | Kim | ...................... | H04L 9/3273 |
| 2019/0187194 A1* | 6/2019 | Sugahara | ................ | G06F 11/28 |
| 2019/0228144 A1* | 7/2019 | Kermes | ............... | H04L 63/0861 |
| 2020/0045044 A1* | 2/2020 | Turgeman | ........... | G06F 3/03543 |
| 2020/0364326 A1* | 11/2020 | Luciani | ................... | G06F 1/266 |
| 2021/0400087 A1* | 12/2021 | Cui | ....................... | H04L 63/083 |

* cited by examiner

*Primary Examiner* — Shin-Hon (Eric) Chen
*Assistant Examiner* — Thomas A Carnes
(74) *Attorney, Agent, or Firm* — Fletcher Yoder, PC

(57) ABSTRACT

Techniques provided herein employ a device monitoring service to provide task to content consumption devices that are steaming digital media from the streaming infrastructure. The tasks, when implemented by the content consumption devices, may reveal differences in task performance between authorized devices, which have the authorization to access the digital media, and imposter devices, which exploit vulnerabilities in the streaming pipeline to access the digital media. In addition, the techniques provided herein may include a machine learning/artificial intelligence model that is trained to recognize authorized and imposter content consumption devices based on their task performance.

17 Claims, 7 Drawing Sheets

SYSTEMS AND METHODS FACILITATING INTERACTIONS BETWEEN IMPOSTER DEVICES AND PROTECTED CONTENT SYSTEMS

CROSS-REFERENCE TO RELATED APPLICATION

This application claims priority to and the benefit of U.S. Provisional Application No. 63/337,849, entitled "SYSTEMS AND METHODS FACILITATING INTERACTIONS BETWEEN IMPOSTER DEVICES AND PROTECTED CONTENT SYSTEMS" and filed May 3, 2022, which is incorporated by reference herein in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, consumers of all ages have increasingly turned to digital media platforms for entertainment, including streaming video on demand. As the demand for digital video content increases, technology companies need to adapt quickly to give consumers a quality video streaming experience. Meanwhile, streaming media operators are dealing with an ongoing problem of their content being directly streamed using the media streaming pipeline by imposter devices, which deceive the digital rights management (DRM) technologies that are designed to keep the media safe from unauthorized consumption, copying, and distribution, by emulating devices authorized by such DRM technologies.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a system comprises a device monitoring service configured to identify a distinguishing task that, when executed by a content consumption device, may indicate whether the content consumption device is an authorized device or an imposter device, provide the distinguishing task to be executed by the content consumption device accessing streaming infrastructure, and provide an imposter device indication indicating whether the content consumption device is likely an imposter device, based upon task behavior data resulting from execution of the distinguishing task by the content consumption device. In addition, the system may include a task behavior data analysis service configured to determine whether the content consumption device is likely an authorized device, or likely an imposter device, based upon a comparison of the task behavior data with a second task behavior data of a known authorized device, a known impostor device, or both.

In an embodiment, a tangible, non-transitory, computer-readable medium, comprises computer-readable instructions that, when executed by one or more processors of a computer, cause the computer to identify at least one distinguishing task, provide the at least one distinguishing task to be implemented by a content consumption device, and distinguish the content consumption device as either: an authorized device or an imposter device, based upon task behavior data resulting from implementation of the at least one distinguishing task by the content consumption device.

In an embodiment, a computer-implemented method comprises performing tasks via known authorized devices and known imposter devices, receiving results of performing the tasks from the known authorized devices and the known imposter devices, and providing training data comprising the results of performing the tasks from the known authorized devices and the known imposter devices for training a machine learning model used to identify likely imposter devices from a set of content consumption devices.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
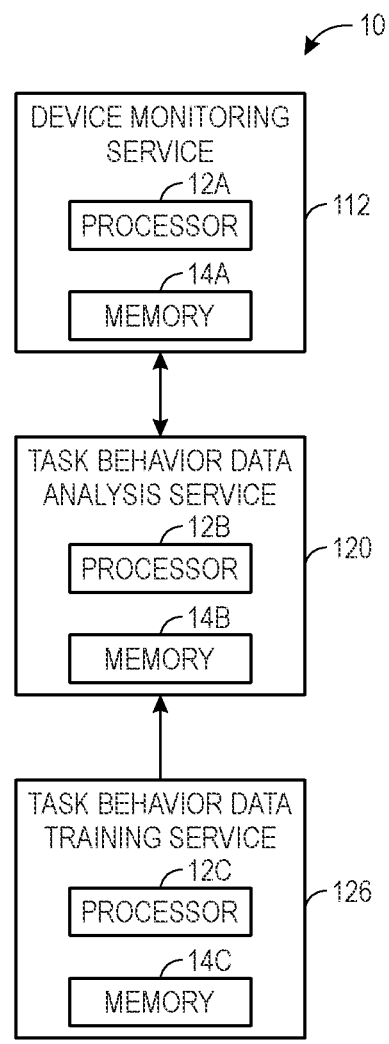
FIG. 1 is a schematic diagram of an imposter device identification service, in accordance with one or more current embodiments.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to system and methods for identification of content consumption devices attempting to deceive user authorization controls such as a digital rights management (DRM) technologies. More specifically, the imposter content consumption devices (e.g., the devices attempting to deceive the user authorization controls) may be identified based on their performance characteristics, which may be observed when the unknown content consumption devices, including authorized devices (e.g., devices authorized to access streaming infrastructure) and imposter devices, implement tasks commanded via commands that are incorporated into the consumed digital content. The system may include task behavior data training service that may provide the tasks to be implemented by known imposter devices and known authorized devices. Based on task implementation results of the known imposter devices and known authorized devices, a task behavior data analysis service may be trained to distinguish imposter devices from authorized devices based on their task performance. In addition, based on task implementation results of the known imposter devices and known authorized devices, the task behavior data analysis service may identify distinguishing tasks for sets of devices with certain characteristics such as type of platform, model year, type of processing hardware, software configuration, etc. Identifying sets of devices with certain characteristics may include selecting devices that are represented by a distinct path in a graph of classification tests. Once distinguishing tasks have been identified, the device monitoring service may facilitate providing distinguishing tasks to unknown content consumption devices via the streaming infrastructure pipeline and, based on task implementation results of unknown content consumption devices, which may include authorized devices and imposter devices, the task behavior data analysis service may identify the imposter devices.

FIG. 1 is a block diagram of an imposter device detection system 10, in accordance with one or more current embodiments. The imposter device detection system 10 may include a device monitoring service 112 that monitors the content consumption devices (also referred to herein as "devices") that access the streaming media via a network. The device monitoring service 112 includes a processor 12A and a memory 14A that facilitate providing tasks (e.g., computational tasks) to content consumption devices for implementation. The imposter device detection system 10 may include a task behavior data analysis service 120 that, based on performance of content consumption devices on some or all of the tasks, identifies content consumption devices that are authorized to access the streaming media (e.g., authorized devices) and/or imposter content consumption devices that access the streaming media without authorization (e.g. imposter devices). The task behavior data analysis service 120 includes a processor 12B and a memory 14B that facilitate processing/analyzing task behavior data received from device monitoring service 112 and training data received from task behavior data training service 126 to identify authorized devices and/or imposter devices. The imposter device detection system 10 may include a task behavior data training service 126 configured to generate training data that may be used by the task behavior data analysis service 120 to identify authorized and/or imposter content consumption devices. The task behavior data training service 126 may include a processor 12C and a memory device 14C that enable generating training data by having known authorized devices and known imposter devices implement the tasks.

In an aspect, the task behavior data analysis service 120 is in communication (e.g., exchanging data) with both the device monitoring service 112 and the task behavior data training service 126. In an aspect, a single computer/computing system includes the task behavior data analysis service 120, the device monitoring service 112, the task behavior data training service 126, or a combination thereof.

The memory devices 14A, 14B, and 14C may include random access memory (RAM), read only memory (ROM), rewritable non-volatile memory such as flash memory, hard drives, optical discs, and/or the like. Additionally, the processors 12A, 12B, and 12C may include one or more general-purpose microprocessors, one or more application-specific processors (ASICs), one or more field programmable gate arrays (FPGAs), or any combination thereof. Further, the memory devices 14A, 14B, and 14C may store instructions executable by the processors 12A, 12B, and 12C to perform the methods and control actions described herein for the imposter device detection system 10.

Figure 2:
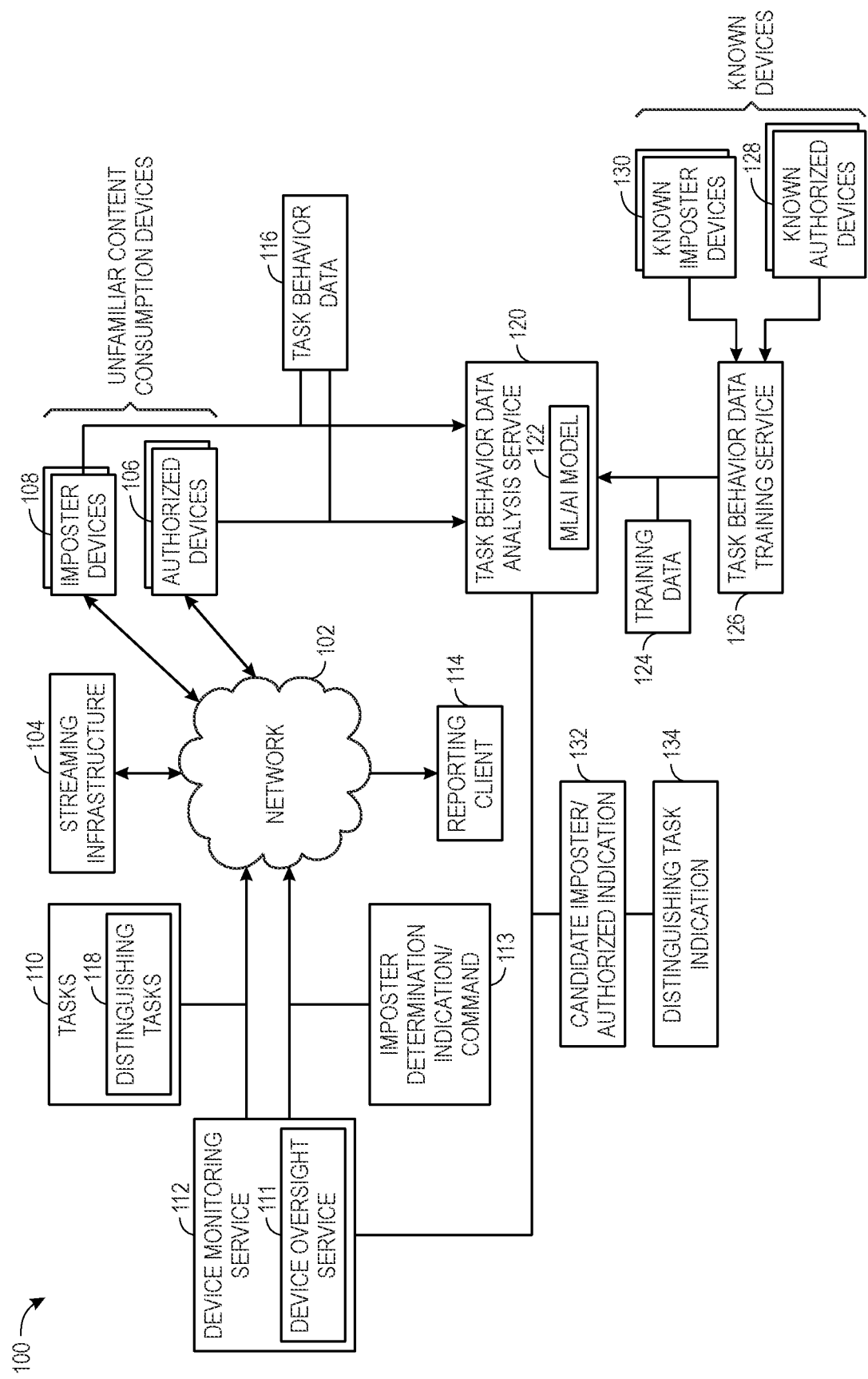
FIG. 2 is a schematic diagram of a content consumption device classification system, in accordance with one or more current embodiments.

FIG. 2 is a schematic diagram of a content consumption device identification system 100 (also referred to herein as "system"), in accordance with one or more current embodiments. As illustrated, unfamiliar content consumption devices may connect to a network 102 in order to access a media streaming infrastructure 104 (also referred to herein as "streaming infrastructure"), which provides the content consumption devices with digital media, such as videos. Connecting to the network 102 allows the content consumption devices to reach the streaming infrastructure 104 via the Internet. The streaming infrastructure 104 includes content delivery network (CDN) servers and digital rights management (DRM) servers, among other things.

The content consumption devices may include both authorized devices 106 and imposter devices 108. The authorized devices 106 include devices that possess valid credentials for accessing the streaming data. The authorized devices 106 include devices that access digital content of streaming services without breaching or deceiving the digital rights management (DRM) protocols of the streaming services. In an example of streaming a movie, an authorized device 106 may be a tablet whose user has purchased viewing privileges to that particular movie and/or phone associated with an active account for a streaming service.

The imposter devices 108 may interact with an ecosystem of authorization controls (e.g., DRM, geofiltering, device recognition) to access media content and pass the authorization checks by masquerading as authorized devices 106. For example, imposter devices 108 may use stolen decryption keys and/or other DRM secrets to appear as authorized devices 106. Alternatively, an attacker's decryption keys may be inserted into the root DRM system to grant access to imposter devices 108. Imposter devices 108 may use the legitimate streaming media pipeline (e.g., CDN, DRM system, video player application in a browser on the client device) and appear as the authorized devices 106 in CDN access logs. In an embodiment, the imposter devices 108 include devices that use DRM secrets extracted from weak DRM systems allowing them to deceive DRM key managers into providing streaming data decryption keys. In an aspect, extracted cryptographic keys may be embedded in an imposter device 108 or a software that runs on the imposter device 108. In another aspect, a server may be set up to answer cryptographic questions for the imposter device 108 using the extracted DRM secrets.

To make a distinction clear between the authorized devices 106 and imposter devices 108, several examples of authorized devices 106 and imposter devices 108 are presented here, but are not intended to provide an exhaustive description of how imposter devices 108 may act as imposters. An authorized device 106 may be a smart TV authorized to play content from a certain streaming platform. An imposter device 108 may be a personal computer (PC) with an illegally obtained decryption keys (e.g., from the smart TV) that emulates the smart TV to access the steaming platform. An authorized device may be an iOS phone associated with an active streaming account. An imposter device 108 may be a jailbroken iOS phone (e.g., a phone with software restrictions imposed by the manufacturer removed) with decryption for a streaming service taken from the authorized phone.

The imposter devices 108 may be different from the authorized devices 106 in their hardware makeup (e.g., different hardware makeup than a typical device makeup of the type of device they ascribe to) and/or software configurations (e.g., having different encryption and/or decryption mechanisms, different operating systems, different drivers, etc. compared to the type of device they ascribe to be). For example, while the authorized devices 106 may include a wide variety of devices (e.g., portable streaming devices, smart TVs, electronic tablets, PCs, and smartphones), the imposter devices 108, in some instances, may include devices with higher processing power, such as personal computers. Although imposter devices 108 may include devices with low processing power, such as portable streaming devices and smart TVs, devices with higher processing power are more versatile, and therefore, more suitable for deceiving the DRM. For this and other reasons, there may be general differences in how the imposter devices 108 and authorized devices 106 operate and perform tasks 110 (e.g., computational tasks). Such differences in operation and, therefore, performance may be used to distinguish the imposter devices 108 and authorized devices 106.

Device monitoring service 112 is a service that triggers tasks to be performed by the content consumption devices accessing the network 102/streaming infrastructure 104. In an embodiment, the device monitoring service 112 may be part of the streaming infrastructure 104. Additionally or alternatively, the device monitoring service 112 may interact with the streaming infrastructure 104 using the network 102. The purpose of the tasks provided by the device monitoring service 112 is to attempt to distinguish the authorized devices 106 from imposter devices 108 based on performance characteristics observed as the devices implement the tasks. As mentioned, both the imposter devices 108 and the authorized devices 106 may use the streaming infrastructure pipeline, which includes the CDN as well as video player applications in the browser. Thus, the tasks may be provided to the content consumption devices through the video player applications in the browser and/or through CDN manifest file.

Just like the authorized devices 106, imposter devices 108 may use unmodified manifests directly from the CDN. Since the imposter devices 108 follow the CDN manifest when accessing the media segments (e.g., segments used in Adaptive Bit Rate (ABR)-based delivery), the imposter devices 108 may be provided with tasks 110, such as special encodings and special encryptions that are embedded in specific media segments, as specified by the manifest. The tasks 110 may or may not relate to consumption and/or playback of the content.

Video player applications are typically configured to respond to commands delivered in the CDN manifest. Thus, tasks can be incorporated into the CDN manifest and passed down to the content consumption devices through the video player application. For example, video player applications that are written in HTML5 may have wide-ranging capabilities, such as a capability to instruct the content consumption device to perform 10,000 iterations of cryptographic hash function calculations (e.g., a hash chain). Evidently, the task may not directly relate to consumption and/or playback of the content but, instead, may be an independent task specifically triggered to observe performance characteristics of the content consumption device. In some instances, the tasks 110 may include tasks that do directly involve the consumption and/or playback of the content. For example, as described herein, a transition in content characteristics (e.g., content frame rate) may be inserted at a portion of the content stream, triggering a consumption and/or playback transition task based upon the content characteristic transition. This type of task, which affects the consumption and/or playback of the content, may also be used to identify imposter devices 108 using the techniques described herein.

While it is difficult to predict in what ways the imposter devices 108 may be different from the authorized devices 106, it is likely that the imposter devices 108 may generally differ from the authorized devices 106 in at least one category: platform (e.g., IOS, Android, Linux), processing capability/hardware (e.g., number and type of graphical processing units [GPUs], central processing units [CPUs]), model year and/or software configuration differences (e.g., which may indicate different types of data transfer protocols, cryptographic functions, etc. that are available and/or configured for use on the content consumption device).

Some tasks may be aimed at elucidating potential processing capability/hardware differences between authorized devices 106 and imposter devices 108. For example, some tasks, such as cryptographic hash chain calculations and deliberately inefficient video encodings, may run faster on devices with graphical processing units (GPUs), on devices that are newer, and/or on devices with higher number of central processing units (CPUs). In addition, use of large media segments (e.g., media segments for Adaptive Bit Rate (ABR)-based delivery) may reveal buffer and memory differences in different content consumption devices. Data indicating such potential differences in task performance may be obtained from CDN logs for video loading (e.g. logs of times when segments were requested from CDN) and network logs (e.g., logs of number of bytes sent and received to/from the client) and may be used to distinguish different classes of content consumption devices (e.g., devices with relatively higher hardware capabilities as compared to devices with relatively lower hardware capabilities).

Some tasks may be aimed at elucidating potential platform differences between authorized devices 106 and imposter devices 108 (e.g., difference between an Android phone and an iOS phone). For example, media frame rate changes, such as frame rate change from 50 Hz to 60 Hz, as well as use of different encoders may result in different responses by devices with different platforms. Such task performance differences may be found by examining CDN logs for video loading, network logs and video player logs, which are all part of task behavior data 116.

Some tasks may be aimed at elucidating potential model year and/or software configuration differences between authorized devices 106 and imposter devices 108. In particular, some tasks may be aimed at detecting "older" devices, which may only support older versions of data transfer protocols and/or devices that have been configured to use less-secure software configurations. Such devices may have security vulnerabilities that make them more likely to be used for unauthorized streaming. Tasks used to identify older devices (e.g., devices with earlier model year and/or older software configurations) may, in some instances, be passive, meaning that they may involve simply streaming the video and reporting telemetry data. Reported data may include information about the transfer protocols and cryptographic functions used in the data transfer between the streaming infrastructure 104, CDN, and content consumption devices.

Due to platform differences, variations in hardware/processing capabilities, differences in model year, and/or differences in software configurations, different content consumption devices may perform differently with respect to tasks 110. On some tasks, the performance of both the authorized devices 106 and the imposter devices 108 may be the same. On other tasks, the performance of the authorized devices 106 may be different from the performance of the imposter devices 108. Furthermore, the performance may vary by the type of device (e.g., a certain model of set top box versus another model of set top box, a personal computer versus a laptop computer, a smart television versus a smart phone, etc.). Certain authorized devices 106 may perform differently from the imposter devices 108 on a task while other authorized devices 106 may perform similarly to the imposter devices 108 on that task. The tasks that result in a significant difference (e.g., exceeding a predetermined threshold) in performance between the authorized devices 106 of a certain type and imposter devices 108 of the same type may be distinguishing tasks 118. For example, if the authorized devices 106 take 10 seconds to perform a hash chain calculation and the imposter devices 108 take 5 seconds to do the same task and a significance threshold is set at 3 seconds, the hash chain calculation may be a distinguishing task 118, as the performance difference of 5 seconds exceeds the significance threshold of 3 seconds.

In addition to passing tasks to the content consumption devices, the device monitoring service 112 also may, based upon device task performance, determine which devices are likely authorized devices 106 and which devices are likely imposter devices 108. Then, based on the imposter determination, the device monitoring service 112 may generate an imposter determination indication 113. For example, an imposter determination indication 113 may be a signal indicating that an imposter device 108 has been detected.

In an aspect, the device monitoring service 112 may include a device oversight service 111 that may disconnect the imposter devices 108 from the streaming infrastructure 104 and/or the network 102 (e.g., based on imposter determination indication). In an aspect, the device oversight service 111 may actively grant or restrict access of content consumption devices to the streaming infrastructure 104 and/or the network 102 based on imposter determination. For example, access of imposter devices 108 to streaming infrastructure 104 and/or the network 102 may be restricted. In an aspect, the device oversight service 111 may blacklist the imposter devices 108 (e.g., by noting their MAC addresses) preventing their future attempts to access media content. In an embodiment, the device oversight service 111 may be separate from the device monitoring service 112.

The system 100 may include a reporting client 114 that may report the imposter determination indication 113 of the device monitoring service 112. In an embodiment, the reporting client 114 may report the commands/actions taken by the device oversight service 111. The reporting client 114 may include a software client that notifies the streaming service provider and/or a network provider that a possible imposter device 108 has been detected. For example, upon receiving an indication of a presence of an imposter device 108, the reporting client 114 may report, based upon task performance, what type of device (e.g. type of platform, hardware, model year) the imposter device 108 is. In an embodiment, a notification sent from the reporting client 114 that indicates a presence of imposter devices 108 may trigger an investigation of the content consumption devices accessing the network 102 with an aim of understanding the vulnerabilities in the streaming pipeline that are being exploited by the imposter devices 108.

In an embodiment, the device monitoring service 112 may use task behavior data 116 to help identify distinguishing task(s) 118 and recognize imposter devices 108. The task behavior data 116 includes data generated by the content consumption devices during implementation of the tasks 110. For example, the task behavior data 116 may include a report of time it took a content consumption device to perform a hash chain computation and a result of the hash chain computation. In addition, the task behavior data 116 may include telemetry data generated by the content consumption devices and the streaming infrastructure 104 in the process of video streaming. Such telemetry data may include CDN logs for video loading (e.g., logs of times when video segments were requested from the CDN, logs of Internet protocol [IP] addresses of requestors), network logs (e.g., logs of amounts of data sent and received to/from client devices), and video player application logs (e.g., logs of playback rate, decode rate, segment rate, buffer fill rate).

In an embodiment, the task behavior data 116 may be sent to the task behavior data analysis service 120 for processing. In an embodiment, the task behavior data analysis service 120 may include a machine learning (ML)/artificial intelligence (AI) model 122, which may analyze the task behavior data 116 to identify the imposter devices 108 and/or the distinguishing tasks 118. The ML/AI model 122 may receive training data 124 from the task behavior data training service 126. The task behavior data training service 126 generates training data 124 by having known authorized devices 128 and known imposter devices 130 implement tasks. Having known content consumption devices implement tasks may enable identification of distinguishing tasks 118 and corresponding performance characteristics that distinguish the known imposter devices 130 from the known authorized devices 128. Thus, the training data 124 has a similar form to the task behavior data 116. However, unlike the task behavior data 116, the training data 124 is labeled (e.g., the training data 124 specifies whether a result belongs to a known imposter device 130 or a known authorized device 128). For example, training data 124 may include an entry specifying that it took a known imposter device 130 10s to perform a task and it took a known authorized device 128 5 seconds to perform the task (or vice versa).

As mentioned above, the training data 124 may be used to identify distinguishing tasks 118. Since the identities (e.g., authorized or imposter) of the content consumption devices that generated the training data 124 are known, tasks that triggered performance differences between the known authorized devices 128 and imposter devices 108 may be identified as distinguishing tasks 118. If a distinguishing task 118 has been identified, the task behavior data analysis service 120 may send a distinguishing task indication 134 to the device monitoring service 112.

In an embodiment, the device monitoring service 112 and the task behavior data analysis service 120 may be two separate services that are in close communication with one another. In this scenario, the task behavior data analysis service 120 sends candidate imposter/authorized device indication 132 as well as distinguishing task indication 134 to the device monitoring service 112. Alternatively, the device monitoring service 112 and task behavior data analysis service 120 may be a single entity, sharing data internally. In an embodiment, the device monitoring service 112 and the task behavior data analysis service 120 may be part of the video streaming pipeline.

Comparing the task behavior data 116 of an unknown content consumption device to the training data 124 may enable determination whether the unknown content consumption device is an imposter device 108 or an authorized device 106. The ML/AI model 122 may classify content consumption devices as authorized devices 106 or imposter devices 108 based on their task behavior data 116 and based on training data 124.

To be able to classify content consumption devices as imposter devices 108 or authorized devices 106 based on the task behavior data 116, the ML/AI model 122 may evaluate the responses (e.g., task behavior data 116) to distinguishing tasks 118 to determine whether their performance on distinguishing tasks 118 is within an expected behavior range for known authorized devices 128 and/or within an expected behavior range of imposter devices 130 (e.g., as indicated by the training data 124). If the task response of a content consumption device falls outside of the expected behavior range of known authorized devices 128 and/or falls within the expected behavior range for known imposter devices 130, the content consumption device may be classified as a possible imposter device.

In some embodiments, a second level monitoring (e.g., verification) may be applied during the classification process. Upon detecting a possible imposter device 108 or a set of possible imposter devices 108, the system 100 may provide additional distinguishing tasks 118 to the devices classified as such. The additional task behavior data 116 (e.g., data gathered from the devices that performed the additional distinguishing tasks) may be used to confirm or refute the classification as an imposter device 108. In addition, the additional task behavior data 116 may be used as the training data 124 to re-train the ML/AI model 122 and make it more sensitive to task behavior data 116 of imposter devices 108. Likewise, the additional task behavior data 116 of content consumption devices classified as authorized devices 106 may be used to re-train or update the ML/AI model 122 to make it more sensitive to task behavior data 116 of authorized devices 106. Thus, ML/AI model 122 can be updated in real-time based on newly generated data (e.g., additional task behavior data 116). Alternatively, the ML/AI model 122 may be updated periodically based on historic data sets (e.g., training data sets generated in the past). In an aspect, additional levels, such as a third, fourth, or fifth level of monitoring (e.g., verification) may be included in the classification process. In this aspect, each additional level of monitoring, or classification verification, or testing may together form an interconnected network of classification tests represented by a graph of nodes where each distinct path through a number of classification tests/nodes represents a distinct set of possible imposter classifications.

As mentioned, certain tasks may trigger performance differences among content consumption devices with different platforms, processing capabilities/hardware, model years, and software configurations. Thus, in an embodiment, the task behavior data analysis service 120 may be designed to classify content consumption devices based on their platform, processing capability/hardware, model year, and software configuration in addition to classifying them as authorized devices 106 or imposter devices 108. For example, a device may be classified as an iOS phone from 2012 or a gamer PC with a GPU. Such classification may help the device monitoring service 112 and task behavior data analysis service 120 better recognize what types of devices typically act as imposter devices 108. This information may help them implement measures that prevent unauthorized streaming by the imposter devices 108 before it happens.

In addition, identification of device characteristics (e.g., type of platform, processing capability/hardware, model year, and/or software configuration) may help tailor in real time the tasks provided to the content consumption devices as some tasks 110 may be distinguishing for devices with certain characteristics and not others. Thus, knowing the characteristics of a content consumption device may help provide the content consumption device with distinguishing tasks 118 that are most likely to trigger performance differences associated with imposter devices 108. For example, authorized Android phones and imposter Android phones may perform differently on task 1 but similarly on task 2. So, if an unknown content consumption device is classified as an Android phone based on its performance on task 2, the device monitoring service 112 may provide this device task 1 to implement. Then, the performance of the Android phone when implementing task 1 may help classify it as an authorized device 106 or an imposter device 108.

In an embodiment, identification of characteristics of the content consumption devices may ensure that task implementation does not reduce a quality of video streaming on the content consumption devices. Based on the characteristics (e.g., platform, hardware, model year, software configuration, etc.) of each content consumption device, the device monitoring service 112 may identify distinguishing tasks 118 that, when implemented by the content consumption device, would not reduce the streaming video quality. For example, if a device with low processing capabilities is given to implement a computationally complex encoding task, it may result in lagging/buffering/low resolution, etc. Thus, if a device is classified by the task behavior data analysis service 120 as having low processing capabilities, the device may be provided with computationally simpler distinguishing tasks 118. Alternatively, content consumption devices (e.g., devices with low processing capabilities) may be given less computationally complex distinguishing tasks 118 based on their real-time performance of distinguishing tasks 118 (e.g., as reflected in the telemetry data logs). For example, if the task behavior data analysis service 120 detects low bit rate on a content consumption device due to implementation of a distinguishing task 118, the device monitoring service 112 may be instructed to provide the content consumption device with a new distinguishing task 118 of the tasks 110, which would not negatively affect the bit rate. Thus, the system 100 may include a feedback mechanism to ensure that the content consumption devices are provided with tasks 110 that would not negatively affect their performance while still enabling the generation of task behavior data 116 that would enable the device monitoring service 112 to distinguish whether the device is an imposter device 108.

In an embodiment, a distinct path through a graph of classification tests may be used to identify sets of content consumption devices with particular characteristics based on task behavior data 116. In an embodiment, the classification tests may identify characteristics of the content consumption devices based on their task performance. For example, a classification test may be a binary classifier that identifies devices as 'likely having a GPU' or 'unlikely having a GPU' based on task behavior data 116 from a hash chain computation task. It may be appreciated that the purpose of a task is to produce task behavior data 116 and the purpose of the classification test is to classify a content consumption device as having a particular characteristic (e.g., having a GPU, using a particular type of encoding, etc.) based on its task behavior data 116.

Figure 3:
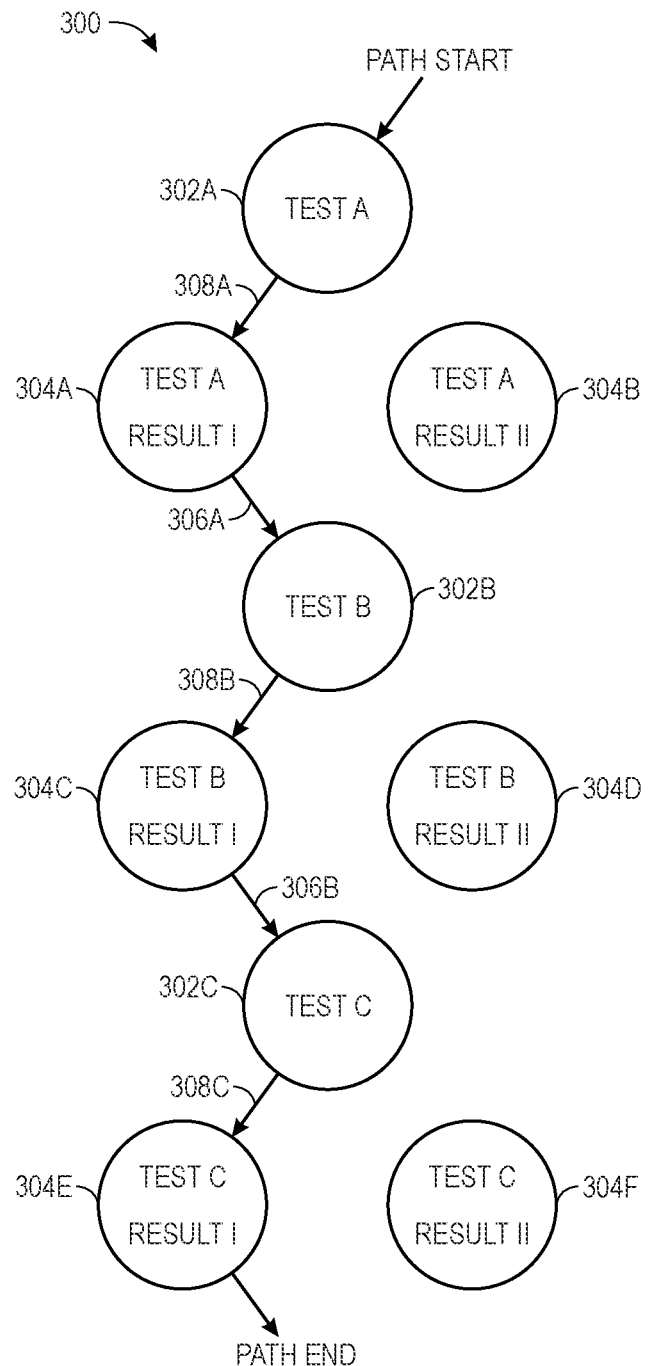
FIG. 3 is a schematic diagram of a distinct path through a graph of three binary classification tests, in accordance with one or more current embodiments.

An example of a distinct path that may identify sets of content consumption devices with particular characteristics is shown in FIG. 3. FIG. 3 is a schematic diagram of a distinct path through a graph 300 of three binary classification tests, in accordance with one or more current embodiments. The graph 300 includes test nodes 302A-302C that represent classification tests and result nodes 304A-304F that represent classification outcomes/results. As shown in FIG. 3, each test node has two associated result nodes. For example, test node 302A represents test A and is associated with result nodes 304A representing result I and result node 304B representing result II. For example, a test node 302A may correspond to a binary classifier that, based on task behavior data 116, identifies content consumption devices that have a large buffer memory. The result nodes for classification test 302A may a include a classification result node indicating that the content consumption device has a large buffer memory (result node 304A) and a classification result node indicating that the content consumption device does not have a large buffer memory (result node 304B).

FIG. 3 also shows operator edges 306A-306B as well as edges 308A-308C that define a distinct path through the graph 300 by connecting each test node (e.g., classification test node) to a result node (e.g., classification result node) and each result node to the next test node respectively. In particular, edges 308A-308C connect test nodes to corresponding result nodes in a distinct path and operator edges 306A and 306B connect result nodes in the distinct path with the next test node.

Since there are two possible results for each of three tests, there are eight possible distinct paths through the graph 300. However, only one of the eight paths is shown in FIG. 3. Each distinct path is associated with a unique combination of classification results enabling the identification of devices that are selected by the distinct path.

The operator edges 306A and 306B may be associated with operators (e.g., 'AND', 'OR', 'NOT', 'XOR') to enable inclusion, exclusion, and combination of devices with certain kinds of classification results selected by the distinct path. For example, if the operator edges 306A and 306B are each associated with 'AND' operators, the distinct path selects only those devices that appear in all the classifications with result I outcomes (e.g., distinct path selects devices where outcomes on all three tests correspond to result I). If the operator edges 306A and 306B are each associated with 'OR' operators, the distinct path through the graph 300 selects any device classified as result I on any or the tree classification tests (e.g., any device where outcome on any of the three tests corresponded to result I). If the operator edges 306A and 306B are each associated with an 'XOR' operators, then the distinct path through the graph 300 selects only devices that were classified as result I on one of the tree classification tests (e.g., only devices where outcome on only one of the tests was result I).

Figure 4:
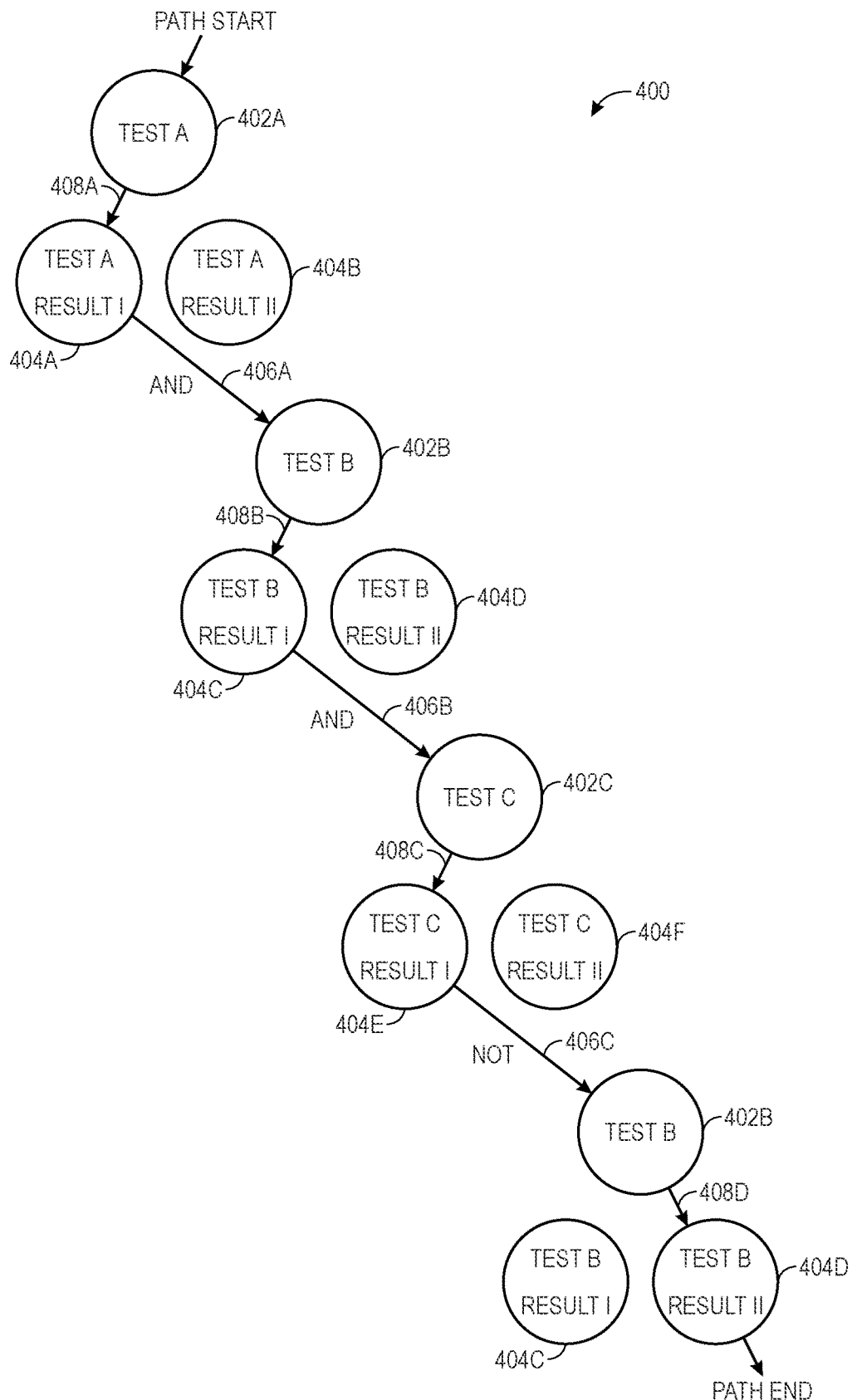
FIG. 4 is a schematic diagram of a distinct path through a graph that includes three binary classification tests and where the distinct path that visits one of the three binary classification tests twice, in accordance with one or more current embodiments.

FIG. 4 is a schematic diagram of a distinct path through a graph 400 that includes three binary classification tests and where the distinct path that visits one of the three binary classification tests twice, in accordance with one or more current embodiments. The graph 400 includes test nodes 402A-402C and result nodes 404A-404F. The distinct path, defined by operator edges 406A-406C and edges 408A-408D selects test B (test node 402B) twice, but each time with a different operator. The first time, the test B is selected with an 'AND' operator (operator edge 406A) and the second time, the test B is selected using 'NOT' operator (operator edge 406C). The first time that the distinct path selects test B (test node 402B), result I on test B (result node 404C) is selected by the distinct path via edge 408B. The second time that the distinct path selects test B (test node 402B), result II on test B (result node 404D) is selected by the distinct path via edge 408D.

The distinct path shown in FIG. 4 represents a set of devices that includes devices classified as result I on tests A, B, and C and excludes devices classified as result II on test B. In other words, the distinct path selects devices that had a result I on tests A, B and C but with devices that did not have result I on test B removed. It is assumed here that the one device can be classified as result I and result II on the same test.

It may be appreciated that the classification tests represented by the test nodes 402A-402C may not be binary classifiers. For example, classification tests may have any number of classification results corresponding to any number of result nodes. In addition, tests nodes may represent statistical classification tests where classification results are associated with confidence scores. For example, devices that are found to match a particular classification on a classification test may fall into a high confidence score and non-matching devices may fall into one or more lower confidence score ranges. For instance, devices that are classified as 'having a GPU' on a classification test that identifies devices with GPUs may fall into a high confidence score range, while devices classified as 'possibly having a GPU' and 'unlikely having a GPU' may fall into low confidence score ranges. In this case, each statistical classification result or each confidence score range may be represented by a result node in the graph 400.

Figure 5:
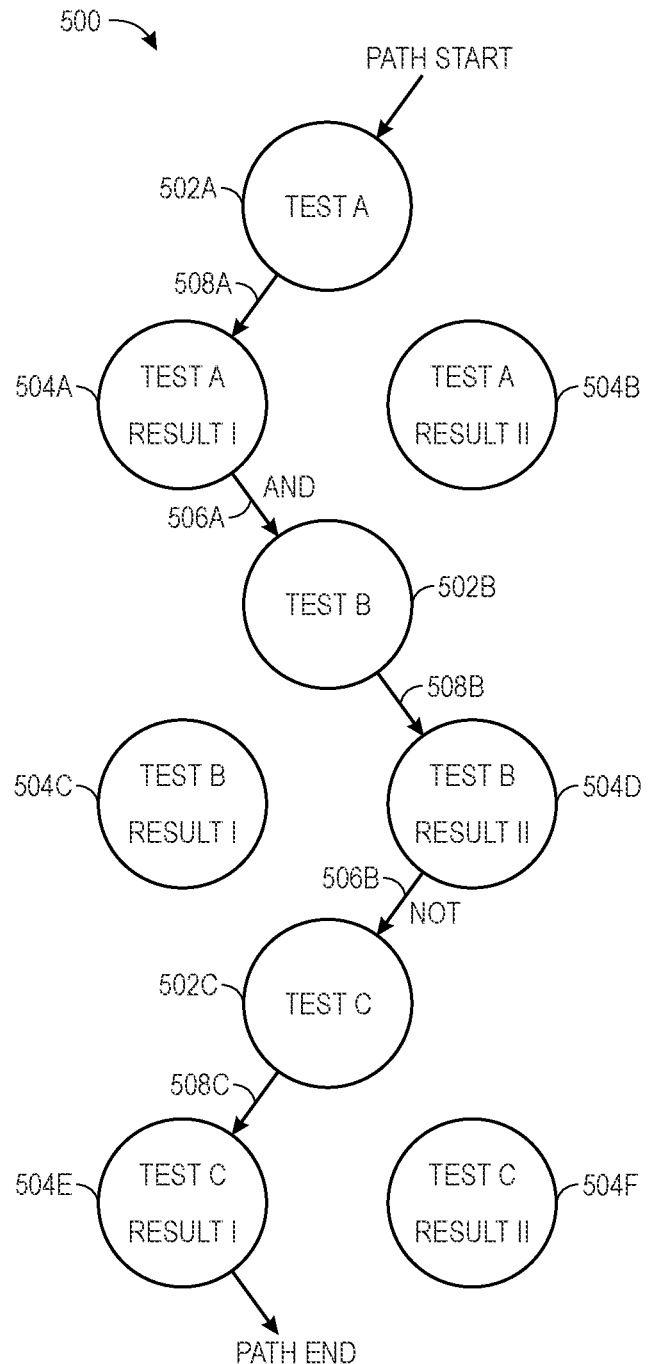
FIG. 5 is a schematic diagram of a distinct path that identifies content consumption devices with three specific characteristics, in accordance with one or more current embodiments.

FIG. 5 is a schematic diagram of a distinct path that identifies content consumption devices with three specific characteristics, in accordance with one or more current embodiments. The three specific characteristics may include being an XYZ model of a TV, not using 50 Hz encoded video, and not requesting decode keys using ABC DRM version 123 of application programing interface (API) call to DRM server. The graph 500 includes test nodes 502A-502C that each represent three binary classification tests, one for each characteristic described above. In addition the graph 500 includes result nodes 504A-504F that represent binary classification results, edges 508A-508C that identify selected classification results, as well as operator edges 506A and 506B that define operators and a sequence in which the tests were applied. The test node 502A may represent a binary classification test trained to recognize an XYZ model of smart TV based on the CDN fetch rate of streaming high efficiency video coding (HEVC) encoded 24 megabit (Mb) 4K resolution video. The possible result nodes for the test node 502A include a result node 504A, which represents a classification result indicating that the content consumption device 'is the XYZ model of the smart TV' and a result node 504B, which represents a classification result indicating that the content consumption device 'is not the XYZ model of the smart TV'. In the distinct path, the result node 504A is selected indicating that the content consumption device is the XYZ model of smart TV. Operator edge 506A represents an operator 'AND' and points to the next classification test, test node 502B.

Test node 502B may represent a classifier trained to recognize devices with streaming video players that use 50 Hz encoded video. The result nodes associated with test node 502B include a result node 504C, which represents a classification result indicating that the video player of the content consumption device 'uses 50 Hz encoded video', and a result node 504D, which represents a classification result indicating that the video player of the content consumption device 'does not use 50 Hz encoded video'. In the distinct path, the result node 504D is selected indicating that video player of the content consumption device does not use 50 Hz encoded video.

Operator edge 506B represents an operator 'NOT' and points to the next test, test node 502C, in the sequence of three tests. The test node 502C may represent a classifier trained to recognize device with streaming video players that request decode keys using a call to a DRM server corresponding to ABC DRM version of 123 API. The possible result nodes include a result node 504E, which represents a classification result indicating that the video player of the content consumption device 'requests decode keys using ABC DRM version 123 API call to DRM server', and a result node 504F, which represents a classification result indicating that the video player of the content consumption device 'does not request decode keys using ABC DRM version 123 API call to DRM server'. In the distinct path, result node 504E is selected. Because the classifier 502C is associated with operator 'NOT', the distinct path selects, via operator edge 506B, devices that do not request decode keys using ABC DRM version 123 API call to DRM server.

The distinct path through the graph 500 identifies a set of content consumption devices that appear to be XYZ model of TV, do not use 50 Hz encoded video in a streaming video player, and do not request decode keys using ABC DRM version 123 API to call to DRM server. Changing the operators associated with the operators 506A and 506B may cause selection of a different set of devices based on classification tests 502A-502C. For example, if the operator edge 506B was associated with an operator 'OR', the distinct path would identify devices that appear to be XYZ model of TV, do not use 50 Hz encoded video, or content consumption devices request decode keys using ABC DRM version 123 API calls to DRM server.

Figures 6, 7:
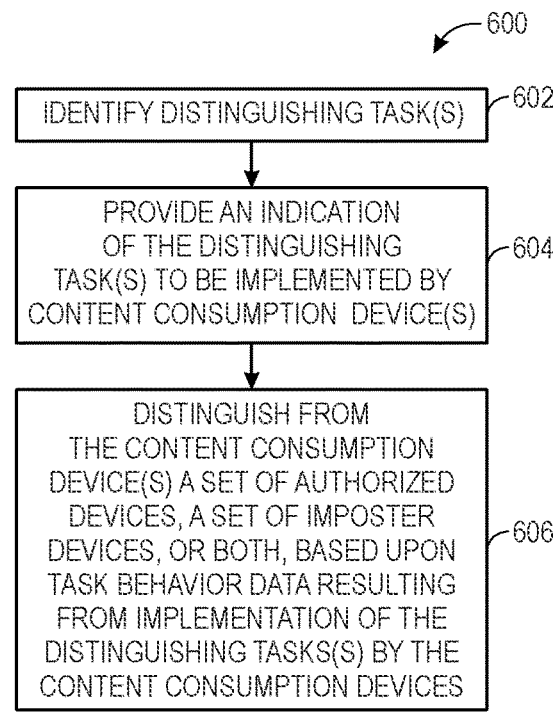
FIG. 6 is a flow chart of a process of distinguishing the authorized devices and imposter devices in a set of content consumption devices based upon task behavior data, in accordance with one or more current embodiments.
FIG. 7 is a flow chart of a training process for determining distinguishing tasks and/or distinguishing task data based upon variations in task performance, in accordance with one or more current embodiments.

FIG. 6 is a flow chart of a process 600 of classifying the content consumption devices as authorized devices 106 or imposter devices 108 based upon task behavior data 116 resulting from implementation of distinguishing tasks 118 by the content consumption devices, in accordance with one or more current embodiments.

The process 600 begins with identifying distinguishing tasks 118 (block 602). As mentioned, distinguishing tasks 118 are those tasks that, when implemented by content consumption devices, result in different performance of authorized devices 106 and imposter devices 108. Identifying the distinguishing tasks 118 may involve analyzing the training data 124, which contains labeled device performance results on a set of tasks 110. As discussed, known authorized devices 128 and known imposter devices 130 may implement tasks 110 producing training data 124. Generally, the tasks 110 that trigger differences in task performance data (e.g., training data) between known authorized devices 128 and known imposter devices 130 are identified as distinguishing tasks 118. As discussed, the distinguishing tasks 118 may be identified, in part, based on characteristics (e.g., type of platform, software configuration, type of hardware, processing capabilities, model year) of the content consumption device to which the distinguishing tasks 118 may be provided.

After the distinguishing tasks 118 are identified, an indication of the distinguishing tasks 118 is provided to be implemented by the content consumption device(s) (block 604). This may involve, for example, the task behavior data analysis service 120 sending a distinguishing task indication 134 to the device monitoring service 112. At this stage in the process, it may be unknown whether the content consumption devices are imposter devices 108 or authorized devices 106. Accordingly, the content consumption devices may be tasked with performing the distinguishing tasks 118. As mentioned, the distinguishing tasks 118, as well as tasks 110, may be provided to the content consumption devices though the CDN manifests and/or video player application instructions and are implemented as part of the video streaming process.

Implementing the distinguishing tasks 118 may involve engaging the hardware of the content consumption devices (e.g., GPUs, CPUs), the data transfer protocols/cryptographic functions, and/or invoking the built-in software of the content consumption devices (e.g., encoders, decoders). Distinguishing tasks 118 may be implemented by the authorized devices 106 and imposter devices 108 in different ways making it possible to distinguish the authorized devices 106 and imposter devices 108 from one another based on the general patterns of their behavior. The results and benchmarks of the task implementation by content consumption devices are found in the task behavior data 116, which is generated by the content consumption devices and provided to the task behavior data analysis service 120 for analysis and device classification.

After the distinguishing tasks(s) 118 have been provided to be implemented by the content consumption devices, a set of possible authorized devices 106, a set of possible imposter devices 108, or both, are distinguished from the content consumption devices based upon task behavior data 116 resulting from implementation of the distinguishing tasks 118 by the content consumption devices (block 606). In an embodiment, the ML/AI model 122 may distinguish the content consumption devices and/or sets of content consumption devices based on the task behavior data 116. In an embodiment, the distinction between the authorized device 106 and the imposter device 108 may be based on whether a task performance benchmark falls within a confidence interval (e.g., 95% confidence interval) of the average authorized/imposter task performance benchmark specified by the training data 124. In an embodiment, distinction between the authorized device 106 and the imposter device 108 may be based upon their respective distinct paths in the graph of classification tests.

FIG. 7 a flow chart of a process 700 of determining distinguishing tasks 118 and/or distinguishing task behavior data 116 based upon the variations in task performance between known authorized devices 128 and known imposter devices 130, in accordance with one or more current embodiments.

The process 700 begins with performing tasks via known authorized devices 128 and imposter devices 130 (block 702). This may involve the task behavior data training service 126 giving the known imposter devices 130 and known authorized devices 128 tasks 110 to perform. In an embodiment, the task behavior data training service 126 may utilize a realistic streaming pipeline (e.g., CDN server, CDN manifest, video player application) designed to make the task performance by the known devices as realistic as possible. In this scenario, the known devices are provided with tasks 110 through the CDN manifest and/or video player application instructions, just like the unknown content consumption devices in real life.

After the known devices have performed the tasks, training data 124 resulting from the task performance is identified (block 704). In an embodiment, identifying training data 124 may involve finding the benchmarks and/or pieces of telemetry data that are relevant to understanding the task performance. For example, for a task that involves changing the size of video segments, data indicative of the buffer fill rate may be identified in the telemetry data logs. In addition, identifying task behavior data 116 may involve receiving reported results of completed tasks at the task behavior data analysis service 120. For example, a resulting value of a hash chain computation may be reported by a device.

After the training data 124 has been identified, variations in the task performance between the known authorized devices 128 and known imposter devices 130 are identified based on the training data 124 (block 706). Variations in task performance may include average differences in task performance benchmarks and/or results. Quantitatively, variations in task performance may be represented by the differences between sampling distributions of results/benchmarks of known authorized devices 128 and known imposter devices 130 for a given task. In an embodiment, statistical values, such as mean and standard deviation, of the sampling distributions (e.g., sampling distributions of the results/benchmarks) may be used to identify variations in task performance. For example, if an average benchmark on a task of a known authorized device 128 exceeds an average benchmark of a known imposter device 130 on the same task, then there is a variation in task performance. In an embodiment, there may be a threshold level of difference in the task performance that, when met, establishes a meaningful level of variation. For example, if an average benchmark of a known authorized device 128 exceeds an average benchmark of a known imposter device 130 by 3%, then there is a significant variation in task performance.

Variations in the task performance between the known authorized devices 128 and known imposter devices 130 may be identified based upon the distinct paths of known authorized devices 128 in the graph of classification tests. For example, known authorized devices 128 may have one distinct path through a set of test nodes and known imposter devices 130 may have a different distinct path through the set of test nodes (e.g., because distinct path of known imposter devices 130 visits different result nodes). The difference between the district paths of the known authorized devices 128 and the known imposter devices 130 may represent variations in the task performance between the known authorized devices 128 and known imposter devices 130.

After the variation in the task performance between the known authorized devices 128 and imposter devices 130 has been identified, distinguishing tasks 118 and/or distinguishing task data are identified based on the variations (block 708). Identifying distinguishing tasks may involve identifying tasks where difference in task behavior between known authorized devices 128 and imposter devices 130 exceeds a certain threshold and/or otherwise significant. In an embodiment, there may be a threshold level of difference in the task performance (e.g., percentage difference) that, when met, indicates a distinguishing task 118. For example, if an average benchmark of a known authorized device 128 on a task exceeds an average benchmark of a known imposter device 130 on the task by 3% (or more), then the task is a distinguishing task 118. In the embodiment where variations in the task performance are represented by a difference in distinct paths through a set of test nodes in a graph of classification tests (e.g., statistical classification tests), the tasks associated with tests/test nodes included in the distinct path through the set of test nodes may be the distinguishing tasks.

Figure 8:
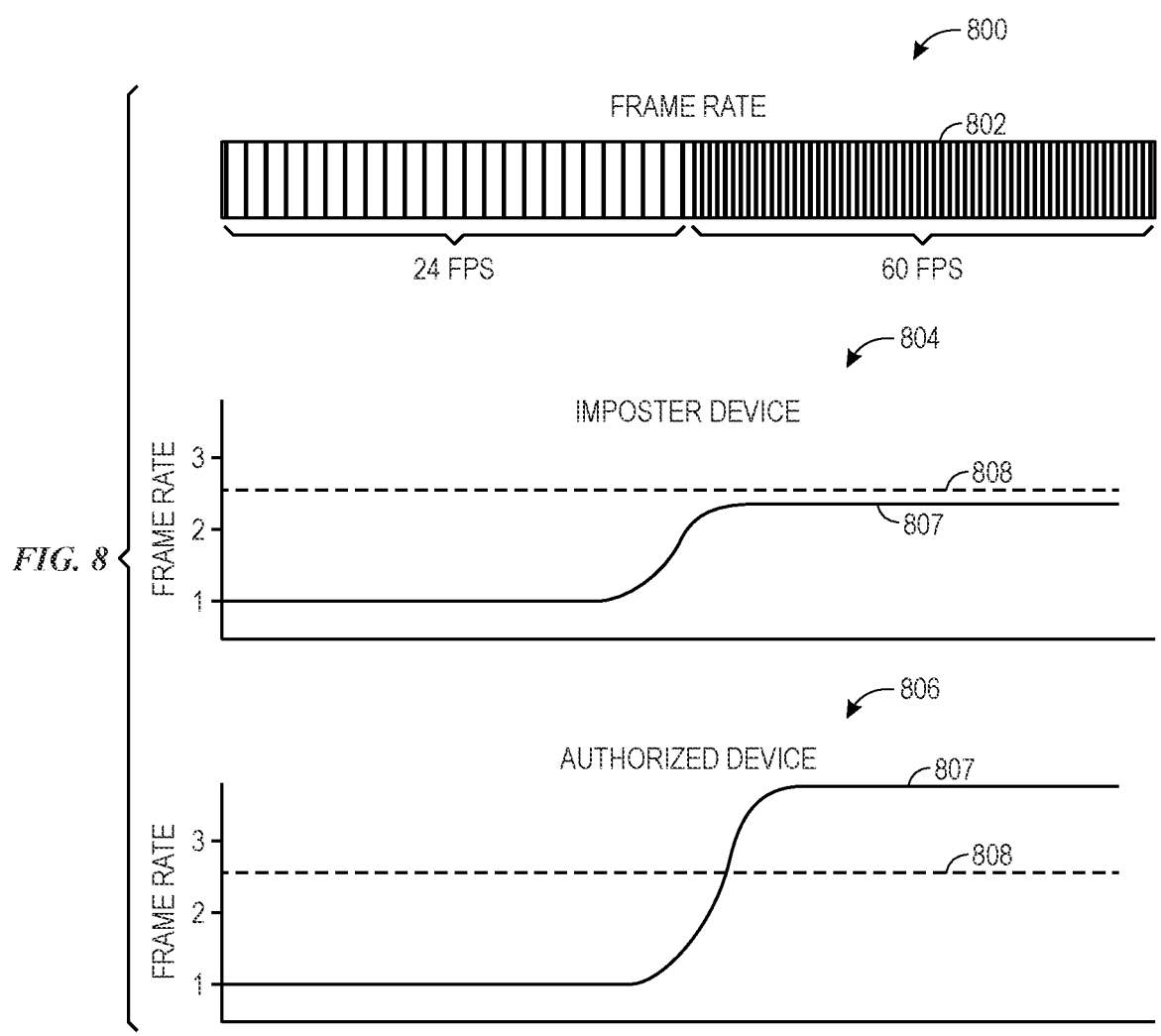
FIG. 8 is a diagram of a distinguishing task and content consumption device performance on the distinguishing task, in accordance with one or more current embodiments.

An additional example of the distinguishing task is shown in FIG. 8. FIG. 8 is a schematic diagram 800 of a distinguishing task and content consumption device performance on the distinguishing task, in accordance with one or more current embodiments. The distinguishing task 802 is a frame rate transition in consumption and/or presentation of streaming media from a relatively slow 24 frames per second (FPS) to a relatively high 60 FPS. Graphs 804 and 806 track the performance of a known imposter device 130 and a known authorized device 128, respectively, on a processor utilization benchmark 807 during the performance of the task 802. During the implementation of the task by the known imposter device 130, the benchmark 807 is low when the framerate is low but increases to an intermediate value when the framerate is high. During the implementation of the task by the known authorized device 128, the benchmark 807 has a similar value to that of the known imposter device 130 when the frame rate is low. However, when the frame rate is high, the benchmark 807 rises above a threshold 808 to a high value. In this example, the rise of the benchmark 807 above the threshold 808 indicates a significant difference in task performance between the known imposter device 130 and the known authorized device 128. Therefore, the task 802 is identified as a potentially distinguishing task.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a device monitoring service comprising one or more first processors, configured to:
identify a distinguishing task of an online streaming infrastructure that, when executed by a content consumption device, distinguishes whether the content consumption device is an imposter device misrepresenting itself as an authorized device that has an authorized hardware makeup, or an authorized software configuration, or both, wherein the distinguishing task comprises hash chain calculations, video encoding, use of video segments, media frame rate changes, changes of video encoding, or a combination thereof;
provide the distinguishing task to be executed by a plurality of content consumption devices; and
for each of the plurality of content consumption devices, provide an imposter device indication, indicating whether the content consumption device is likely an imposter device, based upon task behavior data comprising execution characteristics resulting from execution of the distinguishing task by the content consumption device, wherein the content consumption device is an imposter device when the content consumption device deceives digital rights management (DRM) technologies, emulates a device authorized by the DRM technologies, extracts cryptographic keys from other devices to access media, or any combination thereof; and
a task behavior data analysis service comprising one or more second processors, configured to:
for each of the plurality of content consumption devices:
determine the imposter device indication based upon a comparison of the task behavior data with a second task behavior data of a known authorized device, a known impostor device, or both; and
provide the imposter device indication to the device monitoring service; and
subdivide the plurality of content consumption devices into likely imposter devices and likely authorized devices based on corresponding task behavior data from each of the plurality of content consumption devices resulting from performance of the distinguishing task.

2. The system of claim 1, wherein the task behavior data analysis service comprises a machine learning model configured to:
determine the imposter device indication using the machine learning model trained with training data comprising the second task behavior data.

3. The system of claim 1, comprising:
a task behavior data training service comprising one or more third processors, configured to:
provide a task to known imposter devices and known authorized devices; and
determine whether the second task behavior data resulting from implementation of the task by both the known imposter devices and the known authorized devices results in diverging results between the known imposter devices and the known authorized devices;
identify the task as the distinguishing task based on the determination of the diverging results; and
provide the distinguishing task and associated results of performance of the distinguishing task as training data to be applied to a machine learning model used to identify imposter devices.

4. The system of claim 1, wherein the content consumption device is an authorized device if the content consumption device accesses media with proper digital rights management (DRM) technologies, or with cryptographic keys intended for the content consumption device, or both.

5. The system of claim 1, wherein the task behavior data analysis service configured to:
determine the imposter device indication, based upon a distinct path through a graph of classification tests indicated by the task behavior data.

6. The system of claim 1, comprising:
a device oversight service comprising one or more fourth processors, configured to restrict access to content by the content consumption device when the imposter device indication indicates that the content consumption device is likely an imposter device.

7. A tangible, non-transitory, computer-readable medium, comprising computer-readable instructions that, when executed by one or more processors of a computer, cause the computer to:
identify at least one distinguishing task of an online streaming infrastructure that, when executed by a content consumption device, distinguishes whether the content consumption device is an imposter device misrepresenting itself as an authorized device that has an authorized hardware makeup, or an authorized software configuration, or both, wherein the distinguishing task comprises hash chain calculations, video encoding, use of video segments, media frame rate changes, changes of video encoding, or a combination thereof;
provide the at least one distinguishing task to be implemented by a plurality of content consumption devices;
for each of the plurality of content consumption devices, determine whether the content consumption device is an imposter device, based upon task behavior data comprising execution characteristics resulting from implementation of the at least one distinguishing task by the content consumption device, wherein the content consumption device is an imposter device when the content consumption device deceives digital rights management (DRM) technologies, emulates a device authorized by the DRM technologies, extracts cryptographic keys from other devices to access media, or any combination thereof; and
subdivide the plurality of content consumption devices into likely imposter devices and likely authorized devices based on corresponding task behavior data from each of the plurality of content consumption devices resulting from performance of the distinguishing task.

8. The tangible, non-transitory, computer-readable medium of claim 7, comprising computer-readable instructions that, when executed by one or more processors of a computer, cause the computer to:
provide the at least one distinguishing task by embedding the at least one distinguishing task in a content delivery network (CDN) manifest consumed by the content consumption device.

9. The tangible, non-transitory, computer-readable medium of claim 7, comprising computer-readable instructions that, when executed by one or more processors of a computer, cause the computer to:
identify the at least one distinguishing task from a set of distinguishing tasks based upon an indication of capabilities of the content consumption device.

10. The tangible, non-transitory, computer-readable medium of claim 7, wherein identifying the at least one distinguishing task comprises identifying, based upon task performance, differences in task performance between known authorized devices and known imposter devices.

11. The tangible, non-transitory, computer-readable medium of claim 7, wherein the content consumption device is distinguished as an imposter device when task behavior data of the content consumption device is within a threshold range of task performance data of a known imposter device, is outside a threshold range of task performance data of a known authorized device, or both.

12. The tangible, non-transitory, computer-readable medium of claim 11, wherein the known imposter device, the known authorized device, or both is selected based upon a type of the content consumption device.

13. The tangible, non-transitory, computer-readable medium of claim 7, comprising computer-readable instructions that, when executed by one or more processors of a computer, cause the computer to:
 receive an indication of the content consumption device having lower computational capabilities based on task behavior data; and
 in response, selecting a computationally simpler distinguishing task to be implemented by the content consumption device.

14. The tangible, non-transitory, computer-readable medium of claim 7, comprising computer-readable instructions that, when executed by one or more processors of a computer, cause the computer to:
 provide an indication of a candidate imposter device, an authorized imposter device, or both to a reporting client.

15. A computer-implemented method, comprising:
 identifying a distinguishing task of an online streaming infrastructure that, when executed by a content consumption device, distinguishes whether the content consumption device is an imposter device misrepresenting itself as an authorized device that has an authorized hardware makeup, or an authorized software configuration, or both, wherein the distinguishing task comprises hash chain calculations, video encoding, use of video segments, media frame rate changes, changes of video encoding, or a combination thereof;
 providing the distinguishing task to be executed by a plurality of content consumption devices; and
 for each of the plurality of content consumption devices:
  determining an imposter device indication, indicating whether the content consumption device is likely an imposter device, based upon task behavior data comprising execution characteristics resulting from execution of the distinguishing task by the content consumption device, wherein the content consumption device is an imposter device when the content consumption device deceives digital rights management (DRM) technologies, emulates a device authorized by the DRM technologies, extracts cryptographic keys from other devices to access media, or any combination thereof and the imposter device indication is determined based upon a comparison of the task behavior data with a second task behavior data of a known authorized device, a known impostor device, or both; and
  providing the imposter device indication; and
 subdividing the plurality of content consumption devices into likely imposter devices and likely authorized devices based on corresponding task behavior data from each of the plurality of content consumption devices resulting from performance of the distinguishing task.

16. The computer-implemented method of claim 15, comprising:
 determining the imposter device indication using a machine learning model trained with training data comprising the second task behavior data.

17. The computer-implemented method of claim 15, comprising:
 providing a task to known imposter devices and known authorized devices;
 determining whether the second task behavior data resulting from implementation of the task by both the known imposter devices and the known authorized devices results in diverging results between the known imposter devices and the known authorized devices;
 identifying the task as the distinguishing task based on the determination of the diverging results; and
 providing the distinguishing task and associated results of performance of the distinguishing task as training data to be applied to a machine learning model used to identify imposter devices.

* * * * *